Dec. 24, 1963       W. H. HOGAN       3,115,015
REFRIGERATION APPARATUS AND METHOD
Filed July 30, 1962                    10 Sheets-Sheet 1

INVENTOR.
Walter H. Hogan
BY
Attorney

Dec. 24, 1963　　　　W. H. HOGAN　　　　3,115,015
REFRIGERATION APPARATUS AND METHOD
Filed July 30, 1962　　　　　　　　　10 Sheets-Sheet 3

INVENTOR.
Walter H. Hogan
BY
Attorney

INVENTOR.
Walter H. Hogan
BY
Attorney

Dec. 24, 1963 W. H. HOGAN 3,115,015
REFRIGERATION APPARATUS AND METHOD
Filed July 30, 1962 10 Sheets-Sheet 9

INVENTOR.
Walter H. Hogan
BY
Attorney

United States Patent Office 3,115,015
Patented Dec. 24, 1963

3,115,015
REFRIGERATION APPARATUS AND METHOD
Walter H. Hogan, Wayland, Mass., assignor to Arthur D. Little, Inc., Cambridge, Mass., a corporation of Massachusetts
Filed July 30, 1962, Ser. No. 213,184
39 Claims. (Cl. 62—6)

This invention relates to refrigeration method and apparatus and more particularly to method and apparatus for attaining low temperatures with the use of extremely small equipment.

There are described and known in the prior art a number of cycles and their apparatus for achieving refrigeration. Many such cycles are based upon the use of expansion engines or turbines. Others involve complicated heat exchange systems, while still others (although somewhat more simple in design) require tightly-fitting pistons and sealing rings which must be capable of operation under extremely low temperatures.

In order to overcome the disadvantages inherent in the prior art refrigeration cycles, method and apparatus were developed for materially lessening these disadvantages. This method and apparatus are the subject of U.S. Patent 2,906,101 in which there is described and claimed a novel refrigeration method and apparatus based upon alternately introducing high-pressure fluid which is initially cooled into an enclosed chamber and discharging low-pressure fluid which has been further cooled in expanding. The method of U.S. Patent 2,906,101 disclosed the delivery of energy external of the system and more particularly is directed to the delivery of mechanical work external of the system.

Although the method and apparatus described in U.S. Patent 2,906,101 has been found to be very satisfactory in producing refrigeration even as low as 4.2° K., they possess an inherent disadvantage in that there is a loss of efficiency experienced because of heat losses. These heat losses are in turn due to the necessity of maintaining a thermal gradient within the system. Even though modifications such as loose-fitting pistons and the like are employed to maintain these heat losses at a minimum, there is a limit on the efficiency which can be attained in the apparatus described in this patent. It can easily be understood that in miniaturized equipment designed to operate at extremely low temperatures even relatively small heat losses are to be avoided if possible. The problem therefore becomes one of not only reducing but of virtually eliminating the thermal gradient responsible for a major portion of heat loss. I have found that the elimination of the thermal gradient is possible through the use of a double-acting system wherein the cold end of the refrigerator is essentially completely isolated from the warm end and connected thereto through regenerators.

In a co-pending application, Serial Number 213,185 filed by me on the same day on which this application was filed, there is described and claimed a refrigeration cycle of the "no-work" type, the term being used to define a cycle from which no mechanical energy is extracted, the energy taken from the system being entirely in the form of sensible heat or thermal energy. The method and apparatus of this invention is, in contrast to that of Serial Number 213,185, a "work cycle" in that mechanical energy is delivered external of the system as will become apparent in the following description.

It is a primary object of this invention to provide a novel refrigeration method which eliminates the thermal gradient existing in a cylinder defining a refrigerating zone and which in turn is the major cause of loss of efficiency in this type of refrigerator. It is another object of this invention to provide a method of the character described which is capable of attaining refrigeration down to about 4.2° K. It is another object of this invention to provide such a method which is flexible in operation and versatile in its application in connection with other methods, for example cooling masers and infra-red detectors.

It is another primary object of this invention to provide an apparatus for refrigeration which is efficient, flexible in arrangement and is capable of a high degree of miniaturization. It is another object to provide refrigeration apparatus of the character described which permits incorporation of auxiliary heat exchange means to attain extremely low temperatures. Yet another object is to provide a refrigeration apparatus which may be made part of other devices such as space vehicles, missiles, infra-red detectors, masers and the like. Other objects of the invention will in part be obvious and in part be apparent hereinafter.

The method of this invention may be described in terms of a cycle which comprises the steps of (a) delivering high-pressure fluid from a high-pressure fluid source into a first enclosed space of variable volume while simultaneously discharging high pressure fluid from a second enclosed space of variable volume thereby cooling said fluid in said second enclosed space, the first and second spaces in combination having a constant volume;

(b) continuing delivery of the high-pressure fluid from the high-pressure fluid source while simultaneously continuing discharge of fluid from the second enclosed space thereby reducing its pressure to that of the low-pressure region;

(c) throughout delivery and discharge in steps (a) and (b) extracting heat from the high-pressure fluid thereby to cool it initially and transferring heat to the low-pressure fluid thereby to heat it;

(d) expanding the high-pressure fluid in the first enclosed spaced to cool it further by discharging it into a low-pressure region while simultaneously supply high-pressure fluid from a high-pressure fluid source to the second enclosed space;

(e) continuing transfer of fluid from the first space thereby reducing its pressure to that of the low-pressure region while simultaneously continuing delivery of the high-pressure fluid from the high-pressure fluid source; and (f) throughout discharge and delivery in steps (d) and (e) transferring heat to the low-pressure fluid to heat it while extracting heat from the high-pressure fluid to cool it initially.

Both the first and second enclosed spaces are maintained at the lowest temperature of the cycle and are complementary in volume, in that they are located within the same chamber having their volumes varied by a piston moving within the chamber and forming an essential gas-tight seal with the walls thereof.

The basic apparatus of this invention comprises a cold chamber of constant volume, a piston within the chamber forming a substantially gas-tight seal with the walls of the chamber and defining therein two subchambers of variable volume; connecting rod means mechanically fixed to the piston and adapted to deliver mechanical work; supply reservoir means for supplying high-pressure fluid; exhaust reservoir means for receiving low-pressure fluid; first passage means connecting the supply reservoir means and the exhaust reservoir means with the first subchamber, and second passage means connecting the supply reservoir means and the exhaust reservoir means with the second subchamber; and heat exchange means associated with the first and second passages and adapted to transfer heat between the high-pressure and low-pressure fluids.

As will be apparent in the following description modifications are possible in the basic apparatus including the use of auxiliary heat exchange means to increase the efficiency of the apparatus and to permit the attainment of extremely low temperatures. All of these modifications will be described in detail below.

The invention accordingly comprises the several steps and the relation of one or more of such steps with respect to each of the others, and the apparatus modifying features of construction and combination of elements and arrangements of parts which are adapted to effect such steps, all as exemplified in the following detailed disclosure. The scope of the invention will be indicated in the claims.

For a fuller understanding of the nature and objects of the invention reference should be had to the following detailed description taken in connection with the accompanying drawings in which FIGS. 1-6 are simplified diagrammatic views of the apparatus of this invention illustrating the steps in the basic cycle;

Figures 1, 2:
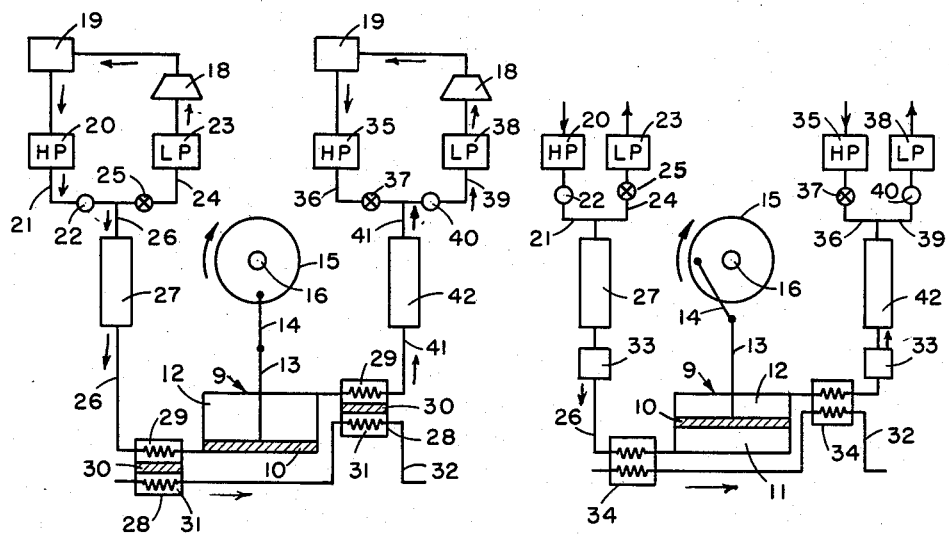

Turning now to FIG. 1, the basic apparatus may first be described before a detailed description of the cycle is given. In this apparatus there is provided a closed chamber 9 having movable within it a piston 10 which forms essentially a gas-tight seal with the internal walls of the cylinder 9. Piston 10 divides the chamber 9 into an upper subchamber 12 and a lower sub-chamber 11, the volumes of which are variable, varying between zero to essentially the volume of chamber 9. An essentially gas-tightly sealed connecting rod 13 is mechanically fixed to piston 10 and through crank arm 14 to a brake 15 (or any other suitable means for absorbing mechanical energy) which in turn is rotated about shaft 16.

With respect to terminology, it will be noted in the detailed description of the apparatus of this invention that the subchambers within the chambers are referred to as "upper" and "lower" subchambers. This is done wholly for convenience and to relate the description to the diagrammatic representations in the drawings. It will be appreciated that the apparatus can function in any position or orientation and it is within the scope of this invention to have it do so.

Associated with each of the cold subchambers 11 and 12 are high-pressure fluid sources and low-pressure fluid reservoirs with accompanying regenerators, heat stations and heat exchangers. Turning first to that portion of the equipment which is associated with lower subchamber 11 it will be seen from FIG. 1 that there is provided a high-pressure reservoir 20 with an associated high-pressure conduit 21 controlled by valve 22. There is also a low-pressure reservoir 23 having a low-pressure conduit 24 controlled by valve 25. Conduits 21 and 24 lead into a fluid path or conduit 26 which joins the reservoirs with subchamber 11. In the passage 26, and associated with it, is a regenerator 27.

In like manner comparable components are associated with upper subchamber 12. These are a high-pressure reservoir 35 leading to a high-pressure conduit 36 controlled by valve 37; and a low-pressure reservoir 38 having low-pressure conduit 39 controlled by valve 40. The main passage 41 to upper subchamber 12 has in it and associated with it regenerator 42. Joining the low- and high-pressure reservoirs are compressors 18 and coolers 19, thus completing the closed fluid system associated with each of the cold subchambers 11 and 12.

In that portion of passages 26 and 41 which communicate between the lower ends of regenerators 27 and 42 and their respective associated subchambers 11 and 12 are located means for stabilizing fluid temperature and for delivering refrigeration to an external load. The temperature of the fluids flowing back and forth in those portions of conduits 26 and 41 which join the lower ends of the regenerators 27 and 42 with subchambers 11 and 12, respectively, will fluctuate relatively widely. For this reason some stabilization in fluid temperature in these regions is dictated by the necessity for high regenerator efficiencies and/or for a reasonable constant level of refrigeration output. Two alternative arrangements for attaining such stabilization are illustrated in FIGS. 1 and 2.

The means for fluid temperature stabilization shown in FIG. 1 includes means for delivering refrigeration to an outside or external load. In this apparatus a heat exchanger 28 is provided which is formed in three sections, section 29 being adapted to effect heat exchange between the fluids flowing in conduit 26 (or 41) with a heat sink 30, formed for example of a mass of lead, or other material which has a high heat capacity in the temperature range represented by the temperature of the cold fluid. The third section 31 of the heat exchanger is adapted to effect heat exchange between the heat sink 30 and an external load, such as a suitable heat transfer fluid circulated in conduit 32. It is, of course, also possible to bring an external load (e.g., an infrared detector) in direct thermal contact with the heat sink 30, thus eliminating the heat transfer fluid and conduit 32. By the use of a heat sink of sufficient magnitude it is possible for it to experience a fluctuating temperature on the side adjacent section 29 and a substantially constant temperature on the side adjacent section 31.

FIG. 2 illustrates an alternative arrangement which provides heat stations 33 (such as those illustrated in FIGS. 13 and 14 of U.S. Patent 2,966,035) to stabilize the operation of regenerators 27 and 42, and a separate means for supplying refrigeration from the system through suitable external loads shown as heat exchangers 34 located at the outlet of subchambers 11 and 12. Refrigeration is transferred externally by means of a suitable heat transfer fluid circulated through heat exchangers 34 by means of a conduit 32. In this case, fluctuations in the refrigeration delivered will be greater than in the apparatus of FIG. 1. In the remaining FIGS. 3-6 these alternatives (i.e., heat exchanger 28 or heat exchanger 34 with heat station 33) are merely designated diagrammatically by a box 45 to simplify the drawings.

Figure 7:
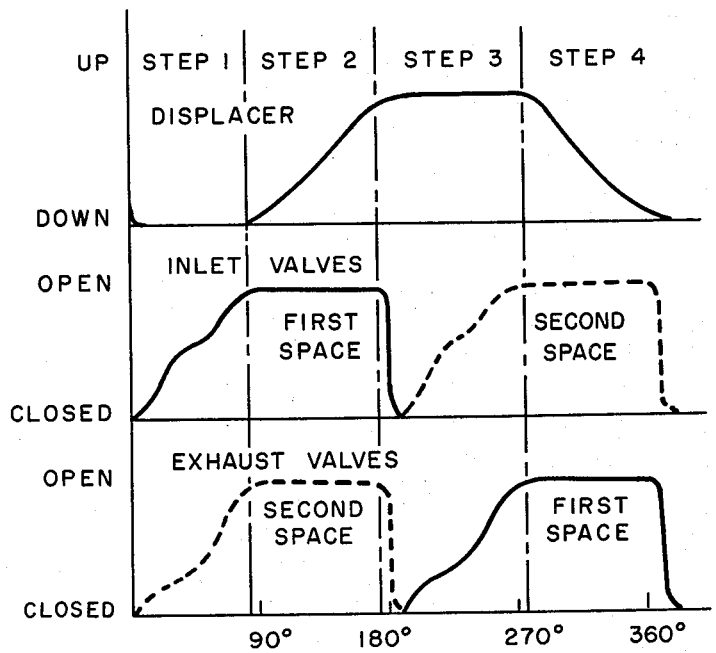
FIG. 7 illustrates a typical operational sequence for the cycle of this invention as related to the operation of the principal valves.

The refrigeration method of this invention may now be described in terms of a cycle and with reference to FIGS. 1-6 which represent the four steps in the cycle. In the drawings, valves which are open are indicated by an open circle whereas those which are closed are indicated by an "x" within the circle. It will be appreciated that compressors 18 and coolers 19 which are shown in FIG. 1 are present in all of the apparatus in FIGS. 1-6. Since they are the same they are not repeated in the drawings. Inasmuch as a description of a method such as this must be somewhat stylized when shown in diagrammatic drawings such as FIGS. 1–6, reference should also be had to FIG. 7 which plots the movement of the piston and the corresponding sequential operations of the four principal valves (22, 25, 37 and 40) which control the flow of high-pressure and low-pressure fluids through both sides of the cycle.

Since the cycle must begin at some point it will be described as beginning with the conditions prevailing in FIG. 1 just as the high-pressure valve 22 and low-pressure valve 40 are opened (valves 25 and 37 are closed). Now at this instant subchamber 12 contains high-pressure fluid which has been initially cooled by passage through regenerator 42. It will be seen that the volume of subchamber 12 is essentially equivalent to the total volume of the chamber 9 while the volume of subchamber 11 is essentially zero. With the opening of high-pressure valve 22 and the closing of high-pressure valve 37 and the simultaneous opening of low-pressure valve 40, the force on piston 10 changes, and the high-pressure fluid entering subchamber 11 by way of regenerator 27, and heat exchanger 28 begins to move piston 10 upwardly. The high-pressure fluid entering subchamber 11 is initially cooled by passage through regenerator 27. Simultaneously the high-pressure fluid in subchamber 12 is exhausted into low-pressure reservoir 38, in the process cooling the external load, stabilizing the temperature in heat exchanger 28 and giving up heat to the regenerator 42. This low-pressure fluid then leaves the system and enters the low-pressure reservoir at a temperature essentially equivalent to that at which high-pressure fluid originally entered.

Figures 3, 4:
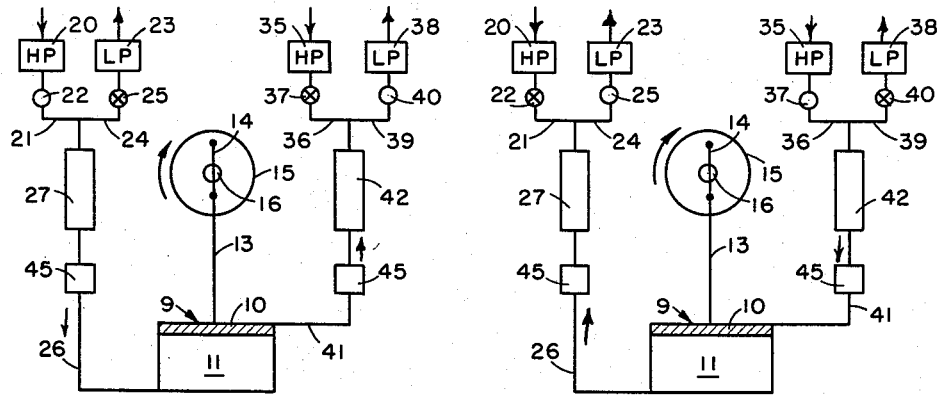
Figure 5:
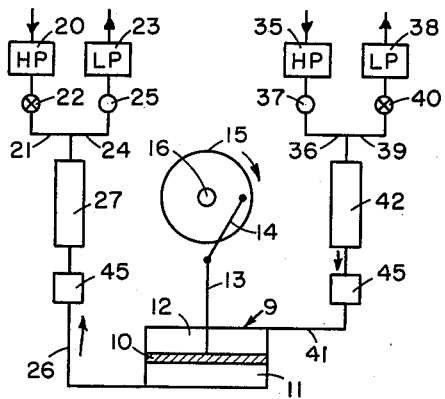
Figure 6:
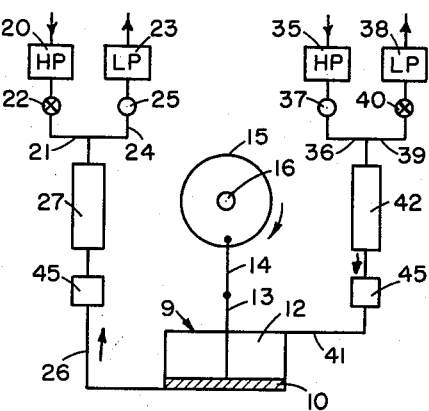

During step 2 which is illustrated in FIGS. 2 and 3, high-pressure fluid from high-pressure reservoir 20 is continued to be delivered at a rate such that essentially constant pressure obtains within lower subchamber 11. It will be appreciated that continuance of high-pressure fluid is required since the volume of the fluid entering subchamber 11 is decreased during the initial cooling in passing through regenerator 27. During this delivery of high-pressure fluid into subchamber 11 the exhausting of fluid is continued until the volume of subchamber 11 is essentially that of the total volume of chamber 9 and the fluid contained therein is still at high-pressure but initially cooled. With the upward movement of piston 10 connecting rod 13 and crank arm 14 drive the brake 15 in the direction shown thus delivering mechanical work external of the system.

During step 3 the cycle is reversed by closing valves 22 and 40 and opening valves 25 and 37. This means that the high-pressure cold fluid in subchamber 11 will exhaust and discharge into low-pressure reservoir 23 and in doing so will be further cooled in its expansion. During the return of the low-pressure fluid it will of course furnish refrigeration to the external load, stabilize the temperature conditions in heat exchanger 28 and cool regenerator 27 and in turn be warmed to a temperature essentially equivalent to that at which it entered as high-pressure fluid in the first step. With the downward movement of piston 10 high-pressure fluid enters subchamber 12 in the same manner in which it was delivered to subchamber 11 in step 1.

Finally the fourth step of the cycle is essentially a duplicate of the second step, with the fluid flow into and out of chambers 11 and 12 reversed. This means the continuance of high-pressure fluid delivery into subchamber 12 to build up in this subchamber high-pressure fluid which is initially cooled; while all of the fluid is discharged from the subchamber 11. At this point the cycle is in a condition to begin again with the first step as described above.

The refrigeration fluids used on each side of the cycle may be the same fluid and may be drawn from a common high-pressure fluid source and exhausted into a common low-pressure reservoir. The fluids on both sides of the cycle may also, of course, be different, in which case separate high-pressure fluid supply means and low-pressure fluid exhaust means must be used for each side as shown in FIG. 1.

Figure 8:
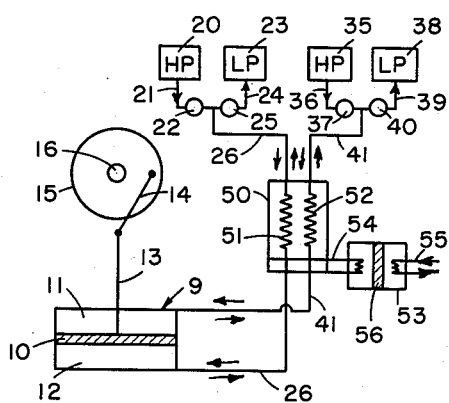
FIG. 8 illustrates a modification of the apparatus showing the use of a countercurrent heat exchanger.

FIG. 8 illustrates a modification of the apparatus in which the two regenerators 27 and 42 of FIG. 1 are combined into a single heat exchanger 50. In this modification the two main paths 26 and 41 to subchambers 11 and 12, respectively, become paths 51 and 52 within heat exchanger 50. Although these paths 51 and 52 within the heat exchanger are illustrated in the conventional manner it will be appreciated that one may be a coil, for example, in a helical configuration, while the other may be defined as the path around the coil. In the arrangement in FIG. 8 the external load is a heat exchanger 53 which is thermally bonded by suitable thermal conduit 54 to the lower or colder end of the heat exchanger 50. Suitable heat transfer liquid is circulated through heat exchanger 53 in conduit 55 and a heat sink 56 may be incorporated in the heat exchanger 53 as in heat exchanger 28 of FIG. 1.

Figure 9:
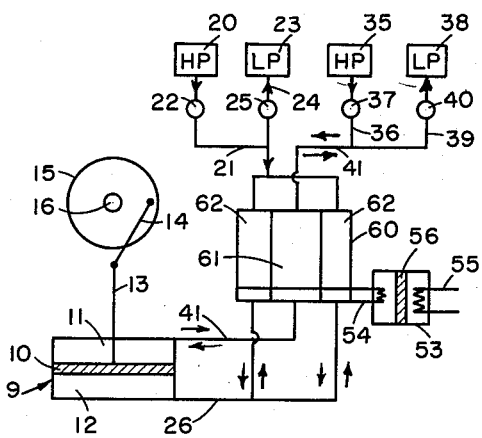
FIG. 9 illustrates another modification of the apparatus showing the use of a combination of countercurrent heat exchanger with a regenerator.
Figure 11:
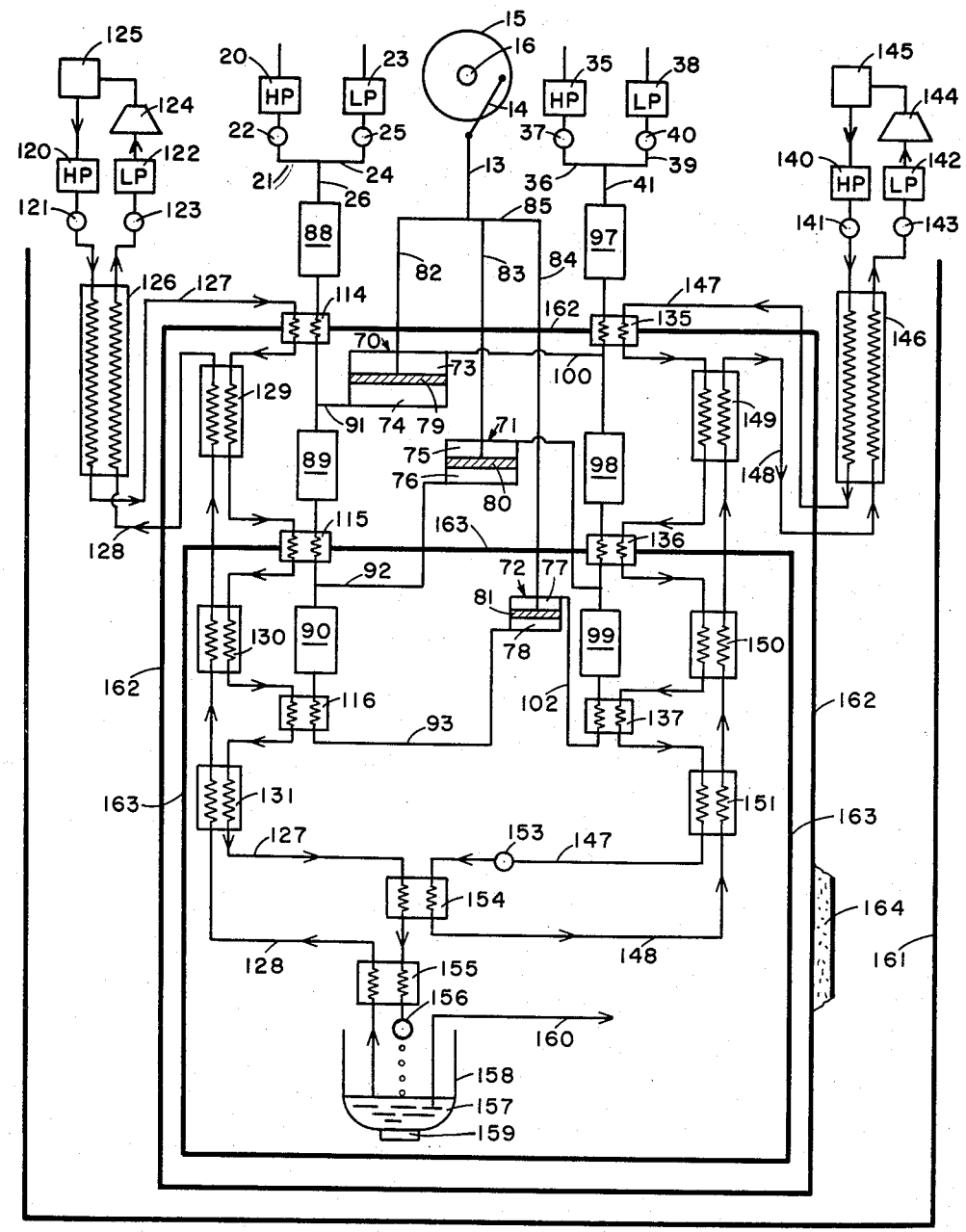
FIGS. 11 and 12 are diagrammatic illustrations of the apparatus of FIG. 9 combined with two modifications of heat transfer cycles.
Figure 12:
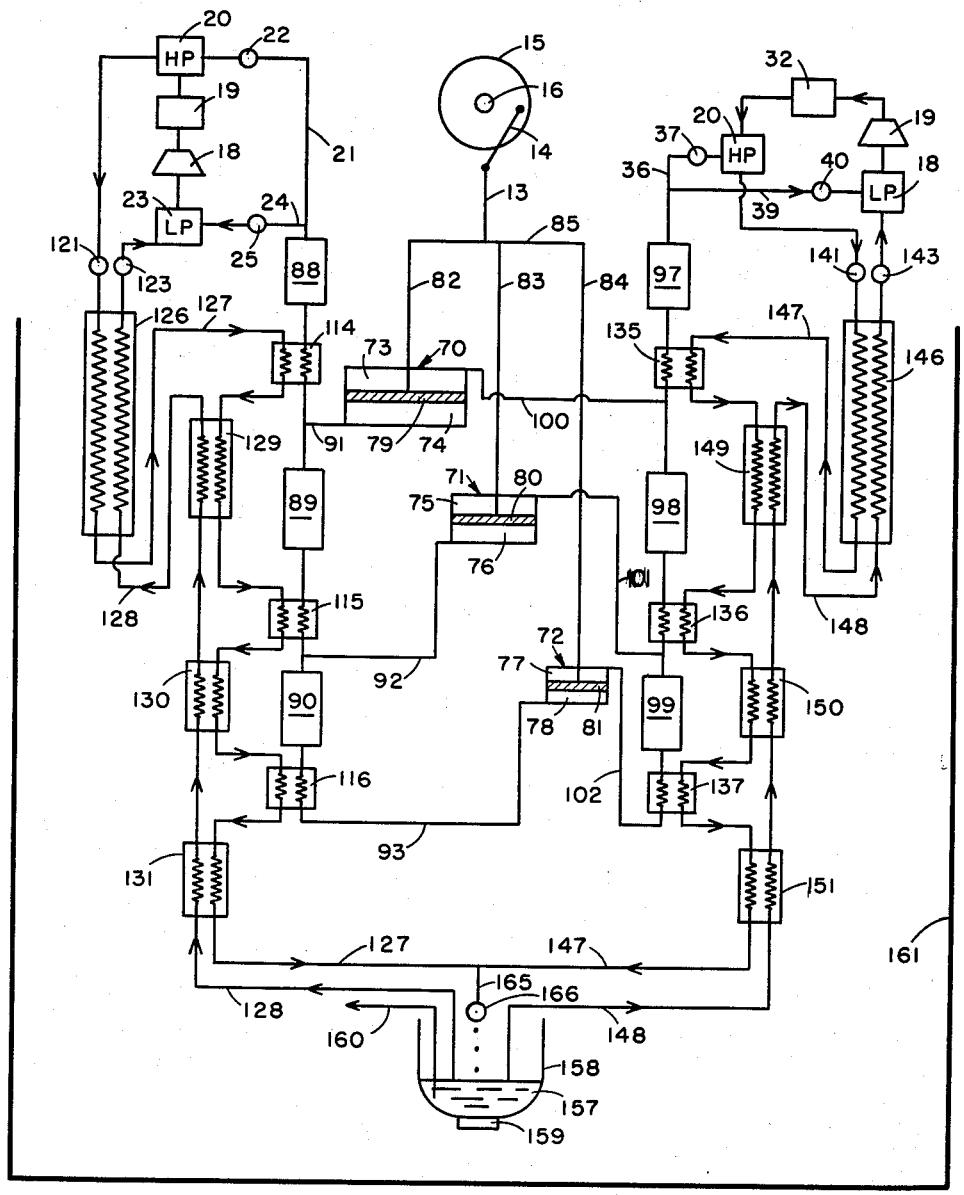

In the apparatus modification of FIG. 9 the heat exchanger means may be termed a combination countercurrent heat exchanger and a regenerator designated as numeral 60. Such a heat exchanger is typically in the form of two concentric shells defining between them an annular space 62 which is occupied by annular foraminous rings held in spaced relationship. The inner shell 61 also contains spaced foraminous disks. Details of such a combination heat exchanger and regenerator are shown in FIGS. 11 and 12 of my co-pending application, Serial Number 213,185 identified above. In this type of heat exchanger the fluid entering and leaving subchamber 11 is shown to flow through the central portion of the heat exchanger whereas the fluid entering and leaving subchamber 12 is shown to come through the cooler or outside portion of the heat exchange means. This arrangement, of course, may be reversed so that the fluid in conduit 41 flows in the annular passage and that in conduit 26 in the central passage.

The basic cycle as described in connection with FIGS. 1–6 is the same for the apparatus of FIGS. 8 and 9 except that the exchange of heat is carried out in different apparatus. The embodiments of the apparatus of FIGS. 8 and 9 are particularly suited to miniaturization.

Figure 10:
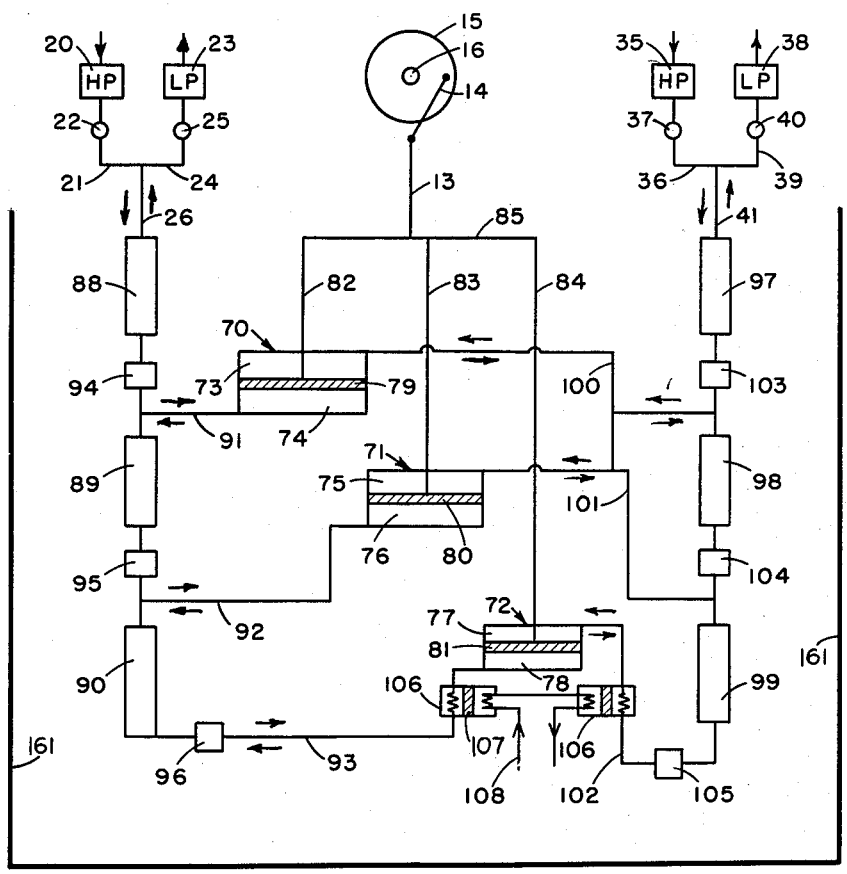
FIG. 10 is a simplified diagrammatic view of a modification of the apparatus of FIGS. 1-6 which illustrates one form of a multiple displacer apparatus.

FIG. 10 is directed to a modification of the apparatus in which there are multiple cold chambers, each successive chamber being maintained at a lower temperature than that above it. In this modification, three cold chambers 70, 71 and 72 are provided. It will be understood, however, that two or more such cold chambers may be used, the arrangement of the three cold chambers in FIG. 10 being illustrative and not limiting.

Located within each of the cold chambers is a piston dividing each of the cold chambers into upper and lower subchambers as in the case of the apparatus in FIGS. 1–6. Thus cold chamber 70 is divided into upper subchamber 73 and lower subchamber 74 by means of piston 79; cold chamber 71 into subchambers 75 and 76 by piston 80; while cold chamber 72 is divided into subchambers 77 and 78 by piston 81. All of the pistons are mechanically connected through connecting rods 82, 83 and 84 with a common arm 85 which in turn is then connected to rod 13 as in the case of the apparatus of FIG. 1.

In the simplified diagram of FIG. 10 all of the three stages are connected in phase. However, one of these, for example, the first stage which is the largest can be 180° out of phase with the second and third stages to provide mechanical balance. In such an arrangement lower subchamber 74 must be connected with upper subchambers 75 and 77 and upper subchamber 73 with lower subchambers 76 and 78 so that all communicating subchambers are expanding or contracting at the same time.

It will be seen from an examination of FIG. 10 that the upper subchambers 73, 75 and 77 are in fact equivalent to upper subchamber 12 of FIG. 1 while lower subchambers 74, 76 and 78 are the equivalent to lower subchamber 11 of FIG. 2. The cold chambers 70, 71 and 72 in this arrangement are maintained at successively lower temperatures beginning with chamber 70.

There is also provided in this arrangement of multiple pistons a series of thermal heat storage means or regenerators. Thus regenerators 88, 89 and 90 are provided in one passage while regenerators 97, 98 and 99 are provided in the other passage. Branch conduits 91, 92 and 93 connect the main passage 26 with the three lower subchambers of the chambers 70, 71 and 72, while branch conduits 100, 101 and 102 connect the main passage 41 with the upper subchambers of these cold chambers. In addition the heat stations 94, 95 and 96 as well as 103, 104 and 105 may be used if desirable. Refrigeration is delivered to an external load through heat exchangers 106 through which a suitable heat transfer fluid is circulated by means of conduit 108 and which may incorporate a heat sink 107 as in heat exchanger 28 of FIG. 1.

In FIG. 10 the basic cycle is that which has been described in connection with FIGS. 1–6, the three successive upper subchambers being equivalent to the one upper subchamber and the three successive lower subchambers being equivalent to the one lower subchamber of FIGS. 1–6 as explained above. By the use of a multiple piston apparatus as indicated in FIG. 10, it is possible to attain lower temperatures than in the apparatus of FIG. 1.

When the multiple piston apparatus of FIG. 10 is used in connection with one or more heat transfer cycles as illustrated in FIGS. 11 and 12, it is possible to attain even lower tempeartures. It will be seen that the apparatus in FIGS. 11 and 12 represent a refrigeration system and a heat transfer system in combination. In both cases, the refrigeration system is that of the multiple piston cycle and apparatus as illustrated in FIG. 10 and described above. In these figures like numbers refer to like elements in the three drawings. The cycle and apparatus of FIG. 11 permit the use of different fluids for the refrigeration fluid and the heat transfer fluid, while the arrangement in FIG. 12 shows how the same fluid may be used in both parts of the cycle. The former arrangement has some advantages if it is desired to obtain extremely low temperatures such as through the liquefaction of $He^3$.

Turning first to the left-hand side of the drawing in FIG. 11, the heat transfer cycle associated with the first passage, or the passage connecting the lower subchambers of the cold chambers, may be described. It will be seen that it comprises a high-pressure reservoir 120 from which high-pressure fluid is supplied and controlled by valve 121. There is also provided a low-pressure reservoir 122 and the discharge of low-pressure fluid into this reservoir is controlled through the use of valve 123. Joining the low-pressure reservoir and the high-pressure reservoir is a compressor 124 and a cooler 125. There is first in the heat transfer cycle a primary heat exchanger 126 through which passes high-pressure fluid in conduit 127 and low-pressure fluid in conduit 128, the flow of the high-pressure and low-pressure fluids being countercurrent. Associated with each of the regenerators 88, 89 and 90 of the refrigeration system are heat exchangers 114, 115 and 116 of the heat transfer system. It will be seen that one of these heat exchangers precedes each of the heat exchangers 129, 130 and 131 which means that the high-pressure fluid passing through heat exchangers 130 is colder than it was in heat exchanger 129 and colder in 131 than in 130.

Turning now to the right-hand side of FIG. 11, the heat transfer system associated with the second passage, or that which joins the upper subchambers of the cold chambers, may be described. As in the case of the first heat-transfer system, it comprises a high-pressure reservoir 140, and associated high-pressure valve 141; a low-pressure reservoir 142 with associated valve 143; and compressor 144 and cooler 145 connecting the two reservoirs. The corresponding main heat exchanger is 146, while the high-pressure conduit is 147 and the low-pressure return conduit is 148. Heat exchangers 135, 136 and 137 are associated with regenerators 97, 98 and 99 of the refrigeration systems and are used in connection with heat exchangers 149, 150 and 151 of the heat transfer cycle as described above.

In the apparatus in FIG. 11 there is provided a modification which permits the use of two different heat transfer fluids in the heat transfer systems, each of these fluids having a different boiling point. For convenience it will be assumed that the fluid with the lower boiling point is in the left-hand heat transfer system. This then provides the opportunity of using expanded cold fluid circulating in the right-hand heat transfer system to cool the lower-boiling fluid before expansion. Apparatus is provided for further cooling the higher-boiling fluid in the way of a Joule-Thomson valve 153 in high-pressure conduit 147. After expansion in this valve the heat transfer fluid is passed through an out-of-contact heat exchanger 154 and then returned to the system by return conduit 148. The lower-boiling fluid is directed into heat exchanger 154 by means of high-pressure conduit 127 where it is further cooled and then taken to heat exchanger 155 where it is cooled by out-of-contact heat exchange with low-pressure fluid as will become evident below. The high-pressure fluid, then at its lowest temperature, is passed through Joule-Thomson valve 156 where a portion of it is liquefied and the liquid 157 is collected in a liquid collection vessel 158. If it is required to revaporize some of this liquid, this may be done by the use of heater 159. At least the unliquefied portion of the fluid (along with any revaporized fluid) is then returned through heat exchanger 155 as noted above and by means of low-pressure return conduit 128 is directed through the heat transfer system to find its way again into low-pressure reservoir 122, cooling the high-pressure fluid as it is introduced through the system. In a like manner the heat transfer fluid in the conduit 148 is returned through the system to cool the high-pressure fluid entering this heat transfer system. Draw-off line 160 is provided for removing cold liquid if this is desired.

Insulation is provided to thermally insulate at least those portions of the equipment maintained at temperatures below ambient temperature. In FIG. 11 this insulation is shown to be an external shell 161 which is preferably evacuated. When the apparatus is to be used to produce refrigeration at relatively low temperatures or to liquefy gases (e.g., hydrogen or helium) then additional protection against heat leaking in from the surrounding atmosphere should be provided. In FIG. 11 this adidtional protection is seen to take the form of one or more cooled radiation shields. Radiation shield 162 is thermally bonded to and cooled by heat exchangers 114 and 135 and is used to shield all the apparatus operating at temperatures below the temperature of the fluids circulating in heat exchangers 114 and 135. If desired, further protection may be realized by the use of a comparable radiation shield 163 thermally bonded to and cooled by heat exchangers 115 and 136. The radiation shields are conveniently constructed from a highly polished metal such as copper. In accordance with known insulation practice the radiation shields may have associated with them insulation material designed to absorb and reflect radiant energy such as shown fragmentarily as insulation packing 164 in FIG. 11.

FIG. 12, in contrast to FIG. 11, illustrates how the same fluid may be used as both a refrigeration fluid and a heat transfer fluid. Here the low-pressure and high-pressure reservoirs are common to the two systems and the high-pressure cold fluid is collected from both of the heat transfer systems into conduit 165 before a part of it may be liquefied by Joule-Thomson valve 166.

The unliquefied portion, along with any revaporized fluid, is returned to each of the systems and if desirable, some of the liquid may be taken out of the system through draw-off line 160. In FIG. 12 there is provided around at least the low temperature portion of the refrigeration apparatus an outer insulation structure 161 which may have radiation shields within it as shown in FIG. 11.

Figure 13:
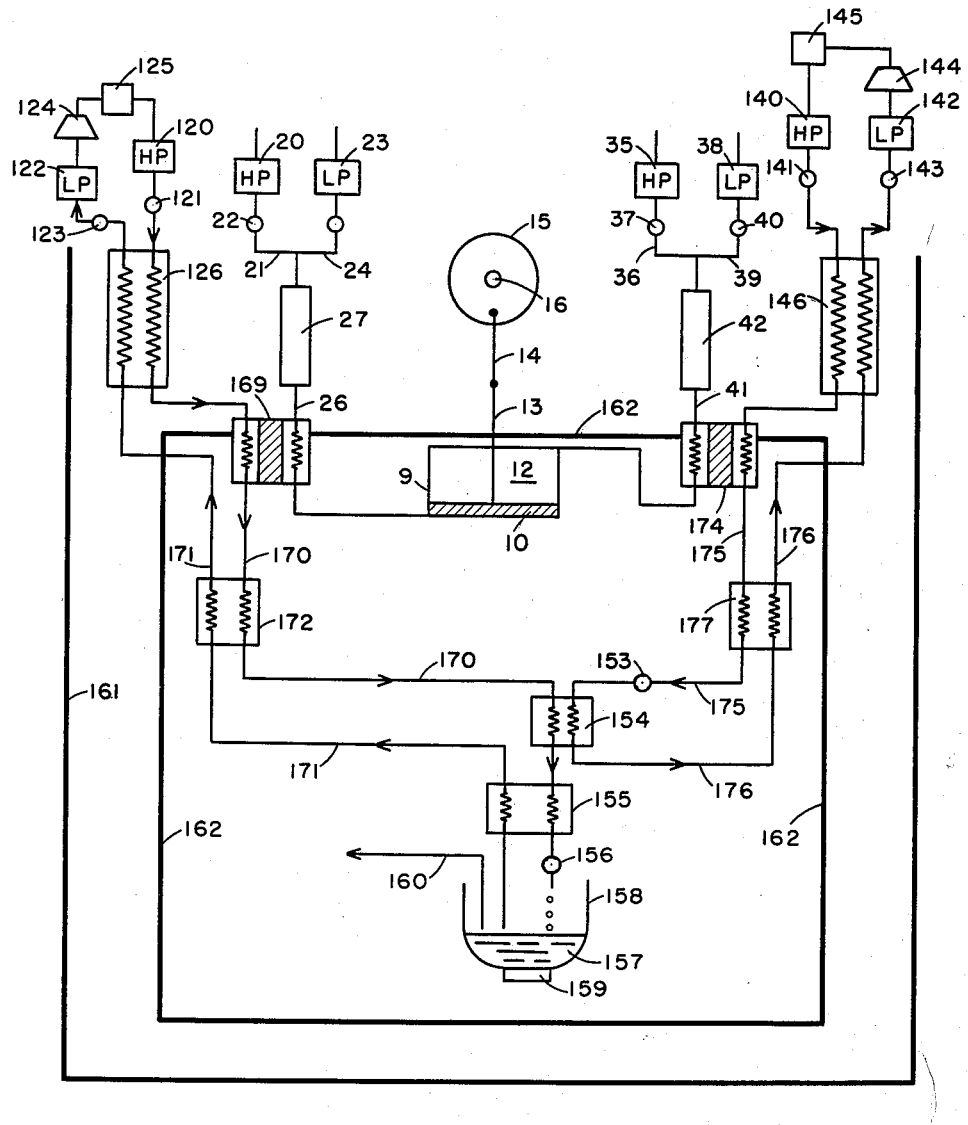
FIG. 13 illustrates a modification of the apparatus of FIG. 1 combined with a heat transfer system.

In the apparatus of FIGS. 11 and 12 the heat transfer systems were combined with a multiple-stage refrigeration system. However, it is also possible to combine heat transfer systems with the single-stage apparatus of FIG. 1. FIG. 13 illustrates such a combination; and in this figure like numerals refer to like elements in FIGS. 1 and 11. In place of a series of heat exchangers (129, 130 and 131 or 149, 150 and 151 of FIG. 11) there is but one heat exchanger 172, or 177, on each side of the cycle. High-pressure conduits 170 and 175 and low-pressure fluid conduits 171 and 176 provide the required fluid flow path in the two heat transfer systems.

The further cooling of one fluid by out-of-contact heat exchange with a partially liquefied fluid is accomplished as in the cycle described for FIG. 11.

In the apparatus of this invention there is virtually complete isolation of the warm and cold portions of the refrigerator. This isolation is achieved through the use of a novel cycle in which high-pressure and low-pressure fluids are employed simultaneously. Net refrigeration is achieved in the form of mechanical energy delivered externally of the system. Although the refrigeration method and apparatus of this invention are particularly well-adapted to miniaturization they may also be used to furnish refrigeration on a relatively large scale at very low temperatures. As an example it may be desirable to cool a large experimental chamber to as low as 20° K., that is approximately to the liquefaction point of liquid hydrogen. The double acting feature of the refrigeration apparatus of this invention is particularly well adapted to furnishing large refrigeration loads at very low temperatures.

When large quantities of refrigeration are required from the method and apparatus of this invention some modifications in both the cycle and the apparatus components may be desirable as indicated in FIGS. 14–20. FIGS. 14–19 compare figure for figure with FIGS. 1–6.

Figure 20:
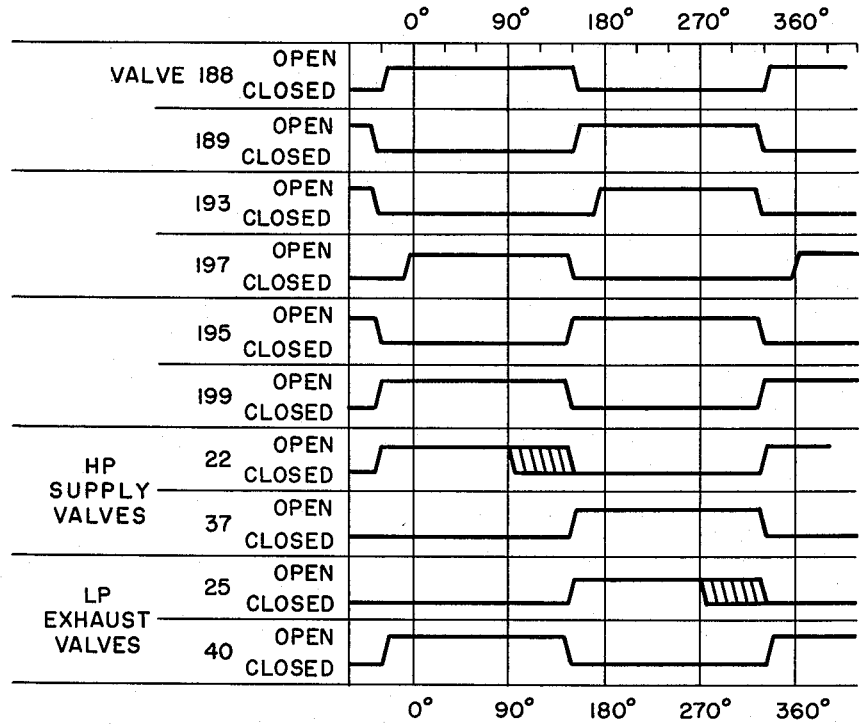
FIG. 20 illustrates a typical operational sequence for the cycle of the apparatus of FIGS. 14-19.

In drawing FIGS. 15–19 the brake 15, and the high-pressure and low-pressure fluid reservoirs, the coolers and the compressors are not repeated since they are identical in each case with the corresponding apparatus of FIGS. 2–6, respectively. Also for purpose of simplification FIGS. 15–19 show only the bottom portion of the regenerators inasmuch as they are identical with those of FIG. 14. As in the case of FIGS. 1–6 an open circle indicates an open valve and a circle with an "x" in it indicates a closed valve. FIG. 20 is comparable to FIG. 7 and it shows the operation of the various valves including those which control the flow of the high-pressure and low-pressure fluids from the supply reservoirs.

Figures 14, 15:
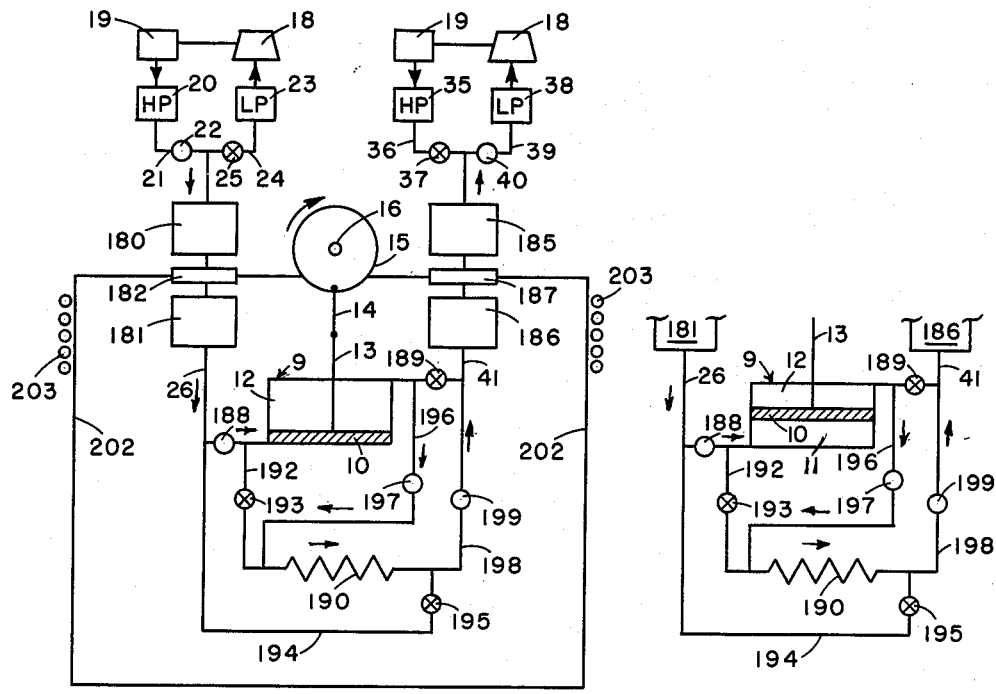
FIGS. 14-19 are simplified diagrammatic views of a modification of the apparatus of FIGS. 1-6 illustrating the steps of a modification in the basic cycle.
Figure 16:
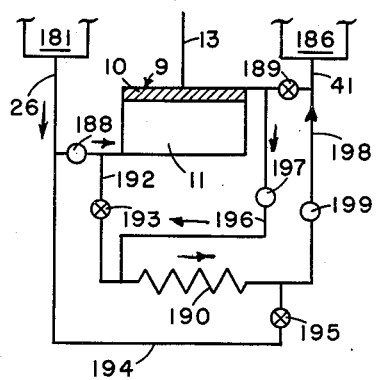

Turning now to FIG. 14, it will be seen that the complete apparatus is illustrated in this figure. As in the basic apparatus of FIGS. 1–6, there are provided a closed cold chamber 9, a displacer and corresponding high-pressure and low-pressure reservoirs. FIG. 14 illustrates a modification which may be made in the thermal storage means in the two passages. In such a modification the regenerators or heat storage means are divided into two sections with a heat station interposed between them. More particularly in FIG. 14 there are regenerators 180 and 181 with heat station 182 between them, all associated with conduit 26. In a similar fashion conduit 41 has associated with it regenerators 185 and 186 joined through a heat station 187. These heat stations are preferably constructed of materials having high heat conductivity at the temperature at which they are operated. They may also contain large masses of materials having high heat capacities serving as temperature stabilizers. Thus, for example, they may be stacked copper disks surrounded by lead. It will be appreciated that these series of regenerators and heat stations replace regenerators 27 and 42 of FIG. 1.

As in the case of the apparatus of FIG. 1 conduit 26 communicates with the lower subchamber 11 and conduit 41 with the upper subchamber 12. However, in the apparatus of FIG. 14 these conduits have valves 188 and 189, the purpose of which will be described later in the description of the cycle. The external load to be refrigerated is represented by heat transfer coils 190 which may of course be in any suitable form for out-of-contact heat exchange capable of delivering the necessary refrigeration to the external load. Connecting conduit 26 and external load 190 is a conduit 192 which is controlled by valve 193. This provides for the introduction of cold fluid from lower subchamber 11 into heat exchanger 190. The fluid from subchamber 11 after passage through heat exchanger 190 is returned to conduit 26 and hence to the refrigeration system through conduit 194 which is controlled by valve 195. In similar manner cold fluid is supplied from upper subchamber 12 to heat exchanger 190 through conduit 196 controlled by valve 197, and returned from heat exchanger 190 to conduit 41 and the refrigeration system through conduit 198 controlled by valve 199.

Inasmuch as pre-cooling of a system which is to deliver refrigeration in the range of 20° K. is not only desirable but usually required, pre-cooling coils 203 are provided for circulating a cooling liquid such as liquefied nitrogen. These preferably surround a radiation shield 202 which is also in thermal contact with and hence cooled by heat stations 182 and 187. The radiation shield may be of a shiny metallic material, e.g., aluminum or copper, such as the radiation shields 162 and 163 shown in FIG. 11.

The cycle represented by FIGS. 14–19 follows that of the cycle shown and described with reference to FIGS. 1–6. The difference lies in the fact that the final expansion of the cold fluids discharged from subchambers 11 and 12 takes place by way of heat exchanger 190. This then necessitates the control of these fluids in the manner illustrated in FIG. 20.

As in the case of the basic cycle the pressure is built up in cold subchamber 11 while high-pressure cold fluid is discharged from cold subchamber 12. However, instead of effecting expansion of the cold fluid to achieve final cooling by permitting it to return directly to the low-pressure reservoir 38, the cold high-pressure fluid from subchamber 12 is directed through heat exchanger 190. This of course is accomplished by opening valve 199 and then subsequently valve 197. It will be seen in FIG. 20 that valves 199 and 40 are opened somewhat before valve 197 to insure transfer and immediate expansion of the fluid through the system into low-pressure reservoir 38. Thus, with the movement of displacer 10 upwardly in FIGS. 14, 15 and 16 the cold fluid which was in subchamber 12 is expanded and transferred to low-pressure reservoir 38. During expansion the fluid of course travels upwardly through regenerators 186 and 185 where heat is stored and the fluid is raised to the discharge temperature. During the delivery of refrigeration to external load 190 by the cold fluid discharged from subchamber 12, valve 189 is closed to prevent any of the cold fluid from returning directly to the refrigeration system through regenerator 186.

Figure 17:
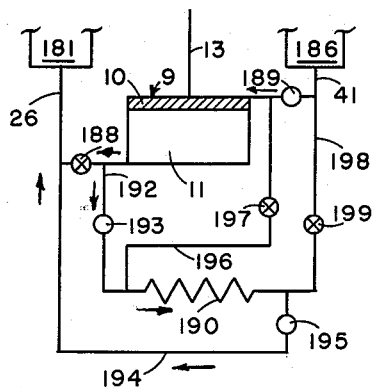
Figure 18:
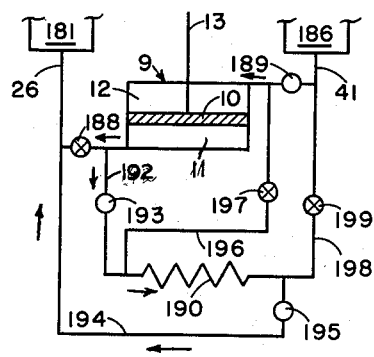
Figure 19:
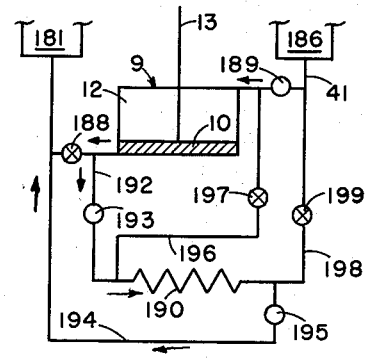

Simultaneously with the delivery of cold fluid from subchamber 12, high-pressure fluid is being built up into chamber 11 after having been initially cooled by passage through regenerators 180 and 181 and heat station 182. This of course requires that valve 188 be open to permit entry of fluid in subchamber 11 and that valves 193 and 195 are closed. With the essentially completely discharge of cold fluid from subchamber 12 and build up of high-pressure cold fluid in subchamber 11 the system is in a condition to be reversed and this is illustrated in FIG. 17. Again, as in the case of the valve operation described above, low-pressure reservoir valve 25 and valve 195 are opened somewhat prior to the opening of valve 193 in order to balance pressures and insure the immediate transfer of fluid and expansion of fluid into low-pressure reservoir 23 by way of heat exchanger 190. During the transfer of the cold fluid from subchamber 11 to heat exchanger 190 and subsequently to low-pressure reservoir 23 valve 189 is open to permit high-pressure fluid to flow into subchamber 12. This means, of course, that valves 197 and 199 are closed and remain closed until all of the cold fluid has been discharged from subchamber 11 and an additional quantity of initially cooled fluid is built up in subchamber 12. At this point the cycle is in a condition to begin again.

FIG. 20 also illustrates that it is possible to close the high-pressure supply valves 22 and 37 over the period of time indicated by the cross-hatched portion in FIG. 20. This means that there is some choice in the operation of the high-pressure supply valves which in turn controls the extent to which the fluid pressure is built up in the cold subchambers 11 and 12.

Figure 21:
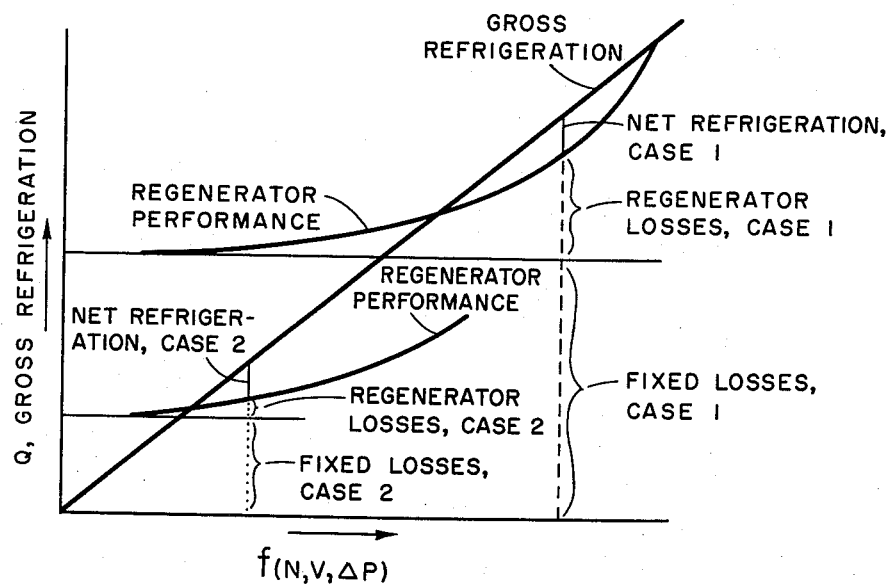
FIG. 21 is a plot of typical refrigerator performances.

The reason for the achievement of the improved thermodynamic efficiencies can best be shown with reference to FIG. 21 in which total work output of a refrigeration system is plotted against increasing values of various operational parameters of which the performance of the refrigerator is a function. These operational parameters are reciprocating speed of the displacer (N), swept volume of the apparatus (V) and pressure difference ($\Delta P$); and they all combine to determine the mass flow within the system.

To begin with, a thermal system such as a refrigerator has a gross refrigeration which may be represented, for purposes of illustration, as the solid diagonal line in FIG. 21. This gross refrigeration of such a system increases with increasing mass flow and is defined by a fairly well-established relationship. The difference between this gross refrigeration and the total heat losses experienced by the system is net refrigeration. The heat losses in turn are made up of so-called "fixed" losses which can be considered to be substantially invariable with respect to the operational parameters and of regenerator losses which are a function of these operational parameters. The fixed losses are a function of $\Delta T$ which is the difference in temperature between ambient or room temperature and the temperature of the cold end of the refrigerator. The regenerator losses are, in turn, a function of mass flow.

Assume for purposes of discussion two cases: case 1 being a system in which the fixed losses are much greater than in case 2. These two situations are represented diagrammatically in FIG. 21. Let case 1 represent the prior art type of refrigerators delivering a fixed net refrigeration. Now it is evident that by reducing the fixed losses (case 2), the gross refrigeration required for the fixed net refrigeration is less and so the regenerators required can be made smaller, i.e., can be made to handle a smaller mass flow. A primary consequence of the use of a smaller regenerator is that its own losses are reduced, hence a further saving in gross refrigeration requirement for a given net refrigeration is realized.

Moreover, the temperature stability of the cold end of the refrigerator is less influenced by changes in ambient temperature because those fixed losses which are primarily a function only of the temperature difference ($\Delta T$) between the warm end and cold end are greatly reduced; while regenerator losses, being a function of mass flow, are more depedent upon the cold end temperature and less dependent upon $\Delta T$. Thus, by decreasing fixed losses greater operational stability and more reliable control are possible.

The method and apparatus of this invention achieve a marked decrease in fixed losses thus realizing the situation for case 2 of FIG. 21. This marked decrease in fixed losses is brought about by the virtual elimination of motional heat transfer which is the heat transferred by a displacer in its moving from the hot to the cold end of a refrigeration cylinder. Such heat transfer necessarily causes heat losses at both ends. In the cycle and apparatus illustrated in U.S. Patent 2,906,101 it has been found that the losses caused by this motional heat transfer can amount to as much as 50% of the total refrigerator output in small units. In the apparatus of this invention motional heat transfer is completely eliminated by the almost complete separation of warm and cold ends, and the full benefit of the use of regenerators, or regenerators in combination with countercurrent heat exchangers, can be realized.

It will, therefore, be appreciated that the improved performance achieved by the method and apparatus of this invention is not a matter of degree but is a matter of providing a refrigeration system in which fixed losses and regenerator losses are rebalanced to achieve optimum operating conditions. The refrigeration cycle is more stable and less sensitive to ambient conditions.

It is apparent that the method and apparatus of this invention are flexible both with respect to the level of refrigeration which can be obtained and to the adaptability of the refrigerator to many uses and with many different devices.

It will thus be seen that the objects set forth above, among those made apparent from the preceding description, are efficiently obtained and, since certain changes may be made in carrying out the above methods and in the constructions set forth without departing from the scope of the invention, it is intended that all matter contained in the above description or shown in the accompanying drawings shall be interpreted as illustrative and not in a limiting sense.

I claim:
1. Refrigeration method, comprising the following steps:
 (a) delivering high-pressure fluid from a high-pressure fluid reservoir into a first enclosed space of variable volume while simultaneously discharging high-pressure fluid from a second enclosed space of variable volume to a low-pressure reservoir thereby cooling said fluid in said second enclosed space, said first and second spaces in combination having a constant volume;
 (b) continuing delivery of high-pressure fluid from said high-pressure fluid reservoir while simultaneously continuing discharging fluid from said second enclosed space thereby reducing its pressure to that of said low-pressure reservoir;
 (c) throughout delivery and discharge of steps (a) and (b) extracting heat from said high-pressure fluid thereby to cool it initially and transferring heat to low-pressure fluid thereby to heat it;
 (d) expanding said high-pressure fluid in said first enclosed space to cool it further by discharging it into a low-pressure reservoir while simultaneously supplying high-pressure fluid from a high-pressure fluid reservoir to said second enclosed space;
 (e) continuing transfer of said fluid from said first space thereby reducing its pressure to that of said low-pressure reservoir while simultaneously continuing delivery of said high-pressure fluid from said high-pressure fluid reservoir; and
 (f) throughout discharge and delivery of steps (d) and (e) transferring heat to low-pressure fluid to heat it while extracting heat from said high-pressure fluid to cool it initially.

2. Method in accordance with claim 1 wherein extracting and transferring heat in steps (c) and (f) comprise storing heat along paths joining said reservoirs and said first and second spaces during delivery of high-pressure fluid and giving up heat along said paths during discharge of low-pressure fluid.

3. Method in accordance with claim 1 wherein extracting and transferring heat in steps (c) and (f) comprise interchanging heat between said high-pressure fluid and said low-pressure fluid during delivery and discharge to and from said first and second spaces.

4. Method in accordance with claim 1 wherein extracting and transferring heat in steps (c) and (f) comprise a combination of storing heat along paths joining said reservoirs and said first and second spaces during delivery of high-pressure fluid and giving up heat along said paths during discharge of low-pressure fluid, and of interchanging heat between said high-pressure fluid and said low-pressure fluid during delivery and discharge to and from said first and second spaces.

5. Method in accordance with claim 1 including the step of contacting said fluids with an essentially constant-temperature surface prior to their delivery to and subsequent to their discharge from said first and second spaces.

6. Method in accordance with claim 1 including the step of delivering refrigeration to an external load.

7. Refrigeration method, comprising the following steps:
(a) delivering high-pressure fluid from a high-pressure fluid source into a series of successive first enclosed spaces of variable volume, each of said first enclosed spaces being maintained at a temperature lower than the preceding one, while simultaneously discharging high-pressure fluid from a series of successive second enclosed spaces of variable volume to a low-pressure reservoir, each of said second spaces being maintained at a temperature lower than the preceding one, thereby cooling said fluid in said second enclosed spaces; corresponding spaces of said first and second series having in combination a constant volume;
(b) continuing delivery of high-pressure fluid from said high-pressure fluid source while simultaneously continuing dischargeing fluid from said second series of enclosed spaces thereby reducing its pressure to that of said low-pressure reservoir;
(c) throughout delivery and discharge of steps (a) and (b) extracting heat from said high-pressure fluid thereby to cool it initially and transferring heat to the low-pressure fluid thereby to heat it;
(d) expanding said high-pressure fluid in said first series of enclosed spaces to cool it further by discharging it into a low-pressure reservoir, while simultaneously supplying high-pressure fluid from a high-pressure fluid source to said second series of enclosed spaces;
(e) continuing transfer of said fluid from said first series of spaces thereby reducing its pressure to that of said low-pressure reservoir while simultaneously continuing delivery of said high-pressure fluid from said high-pressure fluid source; and
(f) throughout discharge and delivery of steps (d) and (e) transferring heat from said low-pressure fluid to heat it while extracting heat from said high-pressure fluid to cool it initially.

8. Method in accordance with claim 7 including the step of contacting said fluids with one surface of an essentially constant temperature mass prior to their delivery to and subsequent to their discharge from said series of first and second spaces, and furnishing refrigeration to an external load through heat transfer with another surface of said mass.

9. The fluid refrigeration method, comprising a refrigeration cycle and a heat transfer cycle, said refrigeration cycle comprising the steps of
(a) delivering high-pressure fluid from a high-pressure fluid source into a series of successive first enclosed spaces of variable volume, each of said first enclosed spaces being maintained at a temperature lower than the preceding one, while simultaneously discharging high-pressure fluid from a series of successive second enclosed spaces of variable volume to a low-pressure reservoir, each of said second spaces being maintained at a temperature lower than the preceding one, thereby cooling said fluid in said second enclosed spaces; corresponding spaces of said first and second series having in combination a constant volume;
(b) continuing delivery of high-pressure fluid from said high-pressure fluid source while simultaneously continuing discharging fluid from said second series of enclosed spaces thereby reducing its pressure to that of said low-pressure reservoir;
(c) throughout delivery and discharge of steps (a) and (b) extracting heat from said high-pressure fluid thereby to cool it initially and transferring heat to the low-pressure fluid thereby to heat it;
(d) expanding said high-pressure fluid in said first series of enclosed spaces to cool it further by discharging it into a low-pressure reservoir while simultaneously supplying high-pressure fluid from a high-pressure fluid source to said second series of enclosed spaces;
(e) continuing transfer of said fluid from said first series of spaces thereby reducing its pressure to that of said low-pressure reservoir while simultaneously continuing delivery of said high-pressure fluid from said high-pressure fluid source; and
(f) throughout discharge and delivery of steps (d) and (e) transferring heat from the low-pressure fluid to heat it while extracting heat from said high-pressure fluid to cool it initially;
said heat transfer cycle comprising the steps of
(a) introducing into a heat transfer system high-pressure heat transfer fluid to initially cool it by out-of-contact heat exchange with low-pressure returning heat transfer fluid;
(b) progressively further cooling said high-pressure heat transfer fluid by out-of-contact heat exchange with the fluids circulated in said refrigeration cycle;
(c) expanding the further-cooled heat transfer fluid to finally cool it; and
(d) recycling at least a portion of the resulting finally-cooled low-pressure heat transfer fluid in out-of-contact heat exchange with said high-pressure heat transfer fluid introduced into said heat transfer system in step (a) of said heat transfer cycle.

10. Method in accordance with claim 9 wherein the fluids in said refrigeration cycle and said heat transfer cycle are different.

11. The fluid refrigeration method, comprising a refrigeration cycle and a heat transfer cycle, said refrigeration cycle comprising the steps of
(a) delivering high-pressure fluid from a high-pressure fluid source into a series of successive first enclosed spaces of variable volume, each of said first enclosed spaces being maintained at a temperature lower than the preceding one, while simultaneously discharging high-pressure fluid from a series of successive second enclosed spaces of variable volume to a low-pressure reservoir, each of said second spaces being maintained at a temperature lower than the preceding one, thereby cooling said fluid in said second enclosed spaces; corresponding spaces of said first and second series having in combination a constant volume;
(b) continuing delivery of high-pressure fluid from said high-pressure fluid source while simultaneously continuing discharging fluid from said second series of enclosed spaces thereby reducing its pressure to that of said low-pressure reservoir;
(c) throughout delivery and discharge of steps (a) and (b) extracting heat from said high-pressure fluid thereby to cool it initially and transferring heat to the low-pressure fluid thereby to heat it;
(d) expanding said high-pressure fluid in said first series of enclosed spaces to cool it further by discharging it into a low-pressure reservoir, while simultaneously supplying high-pressure fluid from a high-pressure fluid source to said second series of enclosed spaces;

(e) continuing transfer of said fluid from said first series of spaces thereby reducing its pressure to that of said low-pressure reservoir while simultaneously continuing delivery of said high-pressure fluid from said high-pressure fluid source; and (f) throughout discharge and delivery of steps (d) and (e) transferring heat from the low-pressure fluid to heat it while extracting heat from said high-pressure fluid to cool it initially;

said heat transfer cycle comprising the steps of (a) introducing a first high-pressure heat transfer fluid into a first heat transfer system associated with said series of first spaces of said refrigeration cycle, while simultaneously introducing a second high-pressure heat transfer fluid into a second heat transfer system associated with said series of second spaces of said refrigeration cycle to initially cool said heat transfer fluids by out-of-contact heat exchange with low-pressure returning heat transfer fluids;

(b) progressively further cooling said first and second high-pressure heat transfer fluids by out-of-contact heat exchange with the fluids circulated in said associated spaces of said refrigeration cycle;

(c) expanding the further-cooled first and second heat transfer fluids to finally cool them; and (d) recycling at least a portion of the resulting finally-cooled first and second low-pressure heat transfer fluids in out-of-contact heat exchange with said first and second high-pressure heat transfer fluids, respectively, introduced in step (a) of said heat transfer cycle.

12. Fluid refrigeration method according to claim 11 wherein said first heat transfer fluid has a boiling point below that of said second heat transfer fluid and the finally-cooled second heat transfer fluid obtained in step (c) of said heat transfer cycle is employed to effect a second further cooling of said first high-pressure heat transfer fluid prior to its expansion to achieve final cooling in step (c).

13. The fluid refrigeration method, comprising a refrigeration cycle and a heat transfer cycle, said refrigeration cycle comprising the steps of (a) delivering high-pressure fluid from a high-pressure fluid reservoir into a first enclosed space of variable volume while simultaneously discharging high-pressure fluid from a second enclosed space of variable volume to a low-pressure reservoir thereby cooling said fluid in said second enclosed space, said first and second spaces in combination having a constant volume;

(b) continuing delivery of high-pressure fluid from said high-pressure fluid reservoir while simultaneously continuing discharging fluid from said second enclosed space thereby reducing its pressure to that of said low-pressure reservoir;

(c) throughout delivery and discharge of steps (a) and (b) extracting heat from said high-pressure fluid thereby to cool it initially and transferring heat to low-pressure fluid thereby to heat it;

(d) expanding said high-pressure fluid in said first enclosed space to cool it further by discharging it into a low-pressure reservoir while simultaneously supplying high-pressure fluid from a high-pressure fluid reservoir to said second enclosed space;

(e) continuing transfer of said fluid from said first space thereby reducing its pressure to that of said low-pressure reservoir while simultaneouly continuing delivery of said high-pressure fluid from said high-pressure fluid reservoir; and (f) throughout discharge and delivery of steps (d) and (e) transferring heat to low-pressure fluid to heat it while extracting heat from said high-pressure fluid to cool it initially;

said heat transfer cycle comprising the steps of (a) introducing into a heat transfer system high-pressure heat transfer fluid to initially cool it by out-of-contact heat exchange with low-pressure returning heat transfer fluid;

(b) progressively further cooling said high-pressure heat transfer fluid by out-of-contact heat exchange with the fluids circulated in said refrigeration cycle;

(c) expanding the further-cooled heat transfer fluid to finally cool it; and (d) recycling at least a portion of the resulting finally-cooled low-pressure heat transfer fluid in out-of-contact heat exchange with said high-pressure heat transfer fluid introduced into said heat transfer system in step (a) of said heat transfer cycle.

14. Refrigeration apparatus, comprising (a) a cold chamber of constant volume;

(b) a piston movable within said chamber and adapted to define therein first and second cold subchambers of variable volume;

(c) high-pressure fluid supply reservoir;

(d) low-pressure fluid exhaust reservoir;

(e) first and second passages communicating between said first and second subchambers, respectively, and said reservoirs; and (f) heat exchange means associated with said first and second passages and adapted to transfer heat between said high-pressure fluid and said low-pressure fluid as they are cycled through said apparatus.

15. Refrigeration apparatus in accordance with claim 14 wherein said heat exchange means comprises first and second heat storage means associated with said first and second passages, respectively.

16. Refrigeration apparatus in accordance with claim 15 further characterized as including thermal heat station means located in said first and second passages and associated with respective said first and second heat storage means, whereby fluctuations in the temperature of said fluids entering and leaving said heat storage means are minimized.

17. Refrigeration apparatus in accordance with claim 14 wherein said heat exchange means comprises a countercurrent, out-of-contact heat exchanger.

18. Refrigeration apparatus in accordance with claim 14 wherein said heat exchange means comprise a combination of countercurrent, out-of-contact heat exchanger and a regenerator.

19. Refrigeration apparatus in accordance with claim 14 further characterized by including auxiliary heat exchange means associated with said passages and adapted to extract refrigeration by means of a heat transfer fluid.

20. Refrigeration apparatus in accordance with claim 14 having auxiliary heat exchange means comprising a mass of material having a high heat capacity at low temperatures and means associated with said mass for delivering refrigeration to an external load, said auxiliary heat exchange means being located in said first and second passages.

21. Refrigeration apparatus, comprising (a) a plurality of cold chambers each of which has a constant volume;

(b) a piston movable within each of said cold chambers and defining within each of said chambers first and second subchambers of variable volume;

(c) high-pressure fluid supply reservoir;

(d) low-pressure fluid exhaust reservoir;

(e) first and second passages communicating between said first and second subchambers, respectively, and reservoirs; and (f) a plurality of thermal storage means located in said first and second passages and adapted to transfer heat between said high-pressure fluid and said low-pressure fluid as they are cycled through said apparatus.

22. Refrigeration apparatus in accordance with claim 21 having auxiliary heat exchange means associated with said first and second passages and comprising a mass of material having a high heat capacity at low temperatures and means thermally bonded to said mass for delivering refrigeration to an external load.

23. Refrigeration apparatus in accordance with claim 21 including insulating means surrounding at least that portion of said apparatus maintained at a temperature below ambient temperature.

24. Refrigeration apparatus, comprising a fluid refrigerating system in combination with a fluid heat transfer system, said fluid refrigerating system comprising
   (a) a plurality of cold chambers each of which has a constant volume;
   (b) a piston movable within each of said cold chambers and defining within each of said chambers first and second subchambers of variable volume;
   (c) high-pressure fluid supply reservoir;
   (d) low-pressure fluid exhaust reservoir;
   (e) first and second passages communicating between said first and second subchambers, respectively, and said reservoirs; and
   (f) a plurality of thermal storage means located in said first and second passages and adapted to transfer heat between said high-pressure fluid and said low-pressure fluid as they are cycled through said apparatus;
said fluid heat transfer system comprising
   (a) first heat exchange means adapted to initially cool incoming high-pressure heat transfer fluid;
   (b) second heat exchange means associated with said first and second passages of said fluid refrigerating system adapted to further cool said high-pressure heat transfer fluid in said fluid heat transfer system subsequent to initial cooling in said first heat exchange means;
   (c) expansion means adapted to finally cool said heat transfer fluid; and
   (d) return conduit means associated with said first heat exchange means adapted to return at least a portion of the low-pressure finally cooled heat transfer fluid through said first heat exchange means and to initially cool said high-pressure incoming heat transfer fluid.

25. Apparatus in accordance with claim 24 including insulating means surrounding at least that portion of said apparatus maintained at temperatures below ambient temperature during operation.

26. Refrigeration apparatus, comprising a fluid refrigerating system in combination with a fluid heat transfer system, said fluid refrigerating system comprising
   (a) a plurality of cold chambers each of which has a constant volume;
   (b) a piston movable within each of said cold chambers and defining within each of said chambers first and second subchambers of variable volume;
   (c) high-pressure fluid supply reservoir;
   (d) low-pressure fluid exhaust reservoir;
   (e) first and second passages communicating between said first and second subchambers, respectively, and said reservoirs; and
   (f) a plurality of thermal storage means located in said first and second passages and adapted to transfer heat between said high-pressure fluid and said low-pressure fluid as they are cycled through said apparatus;
said fluid heat transfer system comprising
   (a) first and second high-pressure heat transfer fluid supply means associated with said first and second passages, respectively, of said refrigerating system;
   (b) first and second low-pressure heat transfer fluid reservoir means associated with said first and second passages, respectively, of said refrigerating system;
   (c) first and second heat exchange means associated with said first passage of said refrigerating system;
   (d) third and fourth heat exchange means associated with said second passage of said refrigerating system; said first and third heat exchange means being adapted to initially cool incoming first and second high-pressure heat transfer fluids; said second and fourth heat exchange means being associated with said thermal storage means in said fluid refrigeration system and adapted to further cool said high-pressure heat transfer fluids by out-of-contact heat transfer with the refrigerating fluids cycled in said refrigeration system;
   (e) first and second expansion means adapted to finally cool said first and second high-pressure heat transfer fluids, respectively, thereby to convert them to low-pressure cold fluids; and
   (f) first and second return conduit means associated with said first and third heat exchange means, respectively, adapted to return at least a portion of said low-pressure cold heat transfer fluids through said first and third heat exchange means in out-of-contact heat exchanger with said incoming high-pressure heat transfer fluids.

27. Refrigeration apparatus in accordance with claim 26 including a second auxiliary heat exchanger between said second expansion means and said second return conduit and a first auxiliary heat exchanger between said second auxiliary heat exchanger and said first expansion means, said auxiliary heat exchangers being adapted to further cool said first high-pressure heat transfer fluid prior to its expansion.

28. Refrigeration apparatus in accordance with claim 26 including insulating means surrounding at least that portion of said apparatus maintained at temperatures below ambient temperatures during operation.

29. Apparatus in accordance with claim 28 wherein said insulating means comprises an outer insulating structure and at least one radiation shield within said outer insulating structure thermally bonded to said second and fourth heat exchange means of said heat transfer system.

30. Refrigeration apparatus, comprising a fluid refrigeration system in combination with a fluid heat transfer system, said fluid refrigerating system comprising
   (a) a cold chamber of constant volume;
   (b) a piston movable within said chamber and adapted to define therein first and second subchambers of variable volume;
   (c) high-pressure fluid supply reservoir;
   (d) low-pressure fluid exhaust reservoir;
   (e) first and second passages communicating between said first and second subchambers, respectively, and said reservoirs; and
   (f) thermal storage means associated with said first and second passages and adapted to transfer heat between said high-pressure fluid and said low-pressure fluid as they are cycled through said apparatus;
said heat transfer system comprising
   (a) first heat exchange means adapted to initially cool incoming high-pressure heat transfer fluid;
   (b) second heat exchange means associated with said first and second passages of said fluid refrigerating system adapted to further cool said high-pressure heat transfer fluid in said fluid heat transfer system subsequent to initial cooling in said first heat exchange means;
   (c) expansion means adapted to finally cool said heat transfer fluid; and
   (d) return conduit means associated with said first heat exchange means adapted to return at least a portion of the low-pressure finally cooled heat transfer fluid through said first heat exchange means and to initially cool high-pressure incoming heat transfer fluid.

31. Refrigeration apparatus, comprising a fluid refrigeration system in combination with a fluid heat transfer system, said fluid refrigerating system comprising (a) a cold chamber of constant volume;
(b) a piston movable within said chamber and adapted to define therein first and second subchambers of variable volume;
(c) high-pressure fluid supply reservoir;
(d) low-pressure fluid exhaust reservoir;
(e) first and second passages communicating between said first and second subchambers, respectively, and said reservoirs; and
(f) thermal storage means associated with said first and second passages and adapted to transfer heat between said high-pressure fluid and said low-pressure fluid as they are cycled through said apparatus; said heat transfer system comprising
(a) first and second high-pressure heat transfer fluid supply means associated with said first and second passages, respectively, of said refrigerating system;
(b) first and second low-pressure heat transfer fluid reservoir means associated with said first and second passages, respectively, of said refrigerating system;
(c) first and second heat exchange means associated with said first passage of said refrigerating system;
(d) third and fourth heat exchange means associated with said second passage of said refrigerating system; said first and third heat exchange means being adapted to initially cool incoming first and second high-pressure heat transfer fluids; said second and fourth heat exchange means being associated with said thermal storage means in said fluid refrigeration system and adapted to further cool said high-pressure heat transfer fluids by out-of-contact heat transfer with the refrigerating fluids cycled in said refrigeration system;
(e) first and second expansion means adapted to finally cool said first and second high-pressure heat transfer fluids, respectively, thereby to convert them to low-pressure cold fluids; and
(f) first and second return conduit means associated with said first and third heat exchange means, respectively, adapted to return at least a portion of said low-pressure cold heat transfer fluids through said first and third heat exchange means in out-of-contact heat exchanger with said incoming high-pressure heat transfer fluids.

32. Refrigeration apparatus in accordance with claim 31 including a second auxiliary heat exchanger between said second expansion means and said second return conduit and a first auxiliary heat exchanger between said second auxiliary heat exchanger and said first expansion means, said auxiliary heat exchangers being adapted to further cool said first high-pressure heat transfer fluid prior to its expansion.

33. Refrigeration apparatus in accordance with claim 31 including insulating means comprising an outer insulating structure and at least one radiation shield within said outer insulating structure thermally bonded to said second and fourth heat exchange means of said heat transfer system.

34. Refrigeration method comprising the following steps
(a) delivering high-pressure fluid from a high-pressure fluid reservoir into a first enclosed space of variable volume while simultaneously discharging high-pressure fluid from a second enclosed space of variable volume by way of a third enclosed space wherein said fluid delivers refrigeration to an external load, said first and second spaces in combination having a constant volume;
(b) continuing delivery of high-pressure fluid from said high-pressure fluid reservoir while simultaneously continuing discharging fluid from said second enclosed space thereby reducing its pressure to that of said low-pressure reservoir;
(c) throughout delivery and discharge of steps (a) and (b) extracting heat from said high-pressure fluid thereby to cool it initially and transferring heat to low-pressure fluid thereby to heat it; and
(d) expanding said high-pressure fluid in said first enclosed space by discharging it by way of said third enclosed space whereby said fluid delivers refrigeration to said external load while simultaneously supplying high-pressure fluid from a high-pressure fluid reservoir to said second enclosed space.

35. Method in accordance with claim 34 wherein said extracting and transferring heat in steps (c) and (f) comprise storing heat along paths joining said first and second spaces and said third and fourth spaces during delivery of high-pressure fluid and giving up heat along said paths during discharge of low-pressure fluid, and being further characterized by the step of surrounding at least said single cold zone and said third enclosed space with radiation shielding.

36. Method in accordance with claim 35 further characterized by the step of cooling said radiation shielding.

37. Refrigeration apparatus comprising
(a) a cold chamber of constant volume;
(b) a piston movable within said chamber and adapted to define therein first and second cold subchambers of variable volume;
(c) high-pressure fluid supply reservoir;
(d) low-pressure fluid exhaust reservoir;
(e) closed cycle heat exchange means adapted to effect fluid expansion and to furnish refrigeration to an external load;
(f) first and second passages communicating between said first and second subchambers, respectively, said closed cycle heat exchange means and said reserviors; and
(g) heat exchange means associated with said first and second passages and adapted to transfer heat between said high-pressure fluid and said low-pressure fluid as they are cycled through said apparatus.

38. Refrigeration apparatus in accordance with claim 37 including at least one radiation shield surrounding at least that portion of said apparatus operating at temperatures below ambient temperatures.

39. Refrigeration apparatus in accordance with claim 38 further characterized by having pre-cooling coils associated with said radiation shields.

References Cited in the file of this patent

UNITED STATES PATENTS 2,966,035    Gifford               Dec. 27, 1960